United States Patent
Zhao

(10) Patent No.: US 9,704,251 B2
(45) Date of Patent: Jul. 11, 2017

(54) DEPTH DETERMINATION METHOD, DEPTH DETERMINATION DEVICE AND ELECTRONIC DEVICE

(71) Applicant: BOE TECHNOLOGY GROUP CO., LTD., Beijing (CN)

(72) Inventor: Jibo Zhao, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 85 days.

(21) Appl. No.: 14/778,028

(22) PCT Filed: Mar. 25, 2015

(86) PCT No.: PCT/CN2015/075043
§ 371 (c)(1),
(2) Date: Sep. 17, 2015

(87) PCT Pub. No.: WO2016/054896
PCT Pub. Date: Apr. 14, 2016

(65) Prior Publication Data
US 2016/0307327 A1    Oct. 20, 2016

(30) Foreign Application Priority Data
Oct. 11, 2014  (CN) .......................... 2014 1 0534378

(51) Int. Cl.
*G06K 9/00* (2006.01)
*G06T 7/00* (2017.01)
(Continued)

(52) U.S. Cl.
CPC ........ *G06T 7/0071* (2013.01); *G06K 9/00335* (2013.01); *G06K 9/00362* (2013.01);
(Continued)

(58) Field of Classification Search
CPC ............ G06K 9/00335; G06K 9/00362; G06T 2207/10016; G06T 2207/10024;
(Continued)

(56) References Cited

U.S. PATENT DOCUMENTS

| | | | |
|---|---|---|---|
| 8,787,663 B2 * | 7/2014 | Litvak | G06K 9/00375 382/165 |
| 8,824,802 B2 * | 9/2014 | Kutliroff | G06K 9/00201 348/143 |

(Continued)

FOREIGN PATENT DOCUMENTS

| | | |
|---|---|---|
| CN | 102301313 A | 12/2011 |
| CN | 102789568 A | 11/2012 |

(Continued)

OTHER PUBLICATIONS

Second Office Action regarding Chinese application No. 201410534378.X, dated Dec. 14, 2016. Translation provided by Dragon Intellectual Property Law Firm.
First Office Action regarding Chinese application No. 201410534378.X, dated Aug. 29, 2016. Translation provided by Dragon Intellectual Property Law Firm.

(Continued)

*Primary Examiner* — Tom Y Lu
(74) *Attorney, Agent, or Firm* — Harness, Dickey & Pierce, P.L.C.

(57) ABSTRACT

The present disclosure provides a depth determination method, a depth determination device and an electronic device. The depth determination method includes steps of: acquiring a color image and a depth image from a camera; performing image identification based on the color image, and determining a first image region of the color image where a feature object is recorded; determining a second image region of the depth image corresponding to the first image region in accordance with a correspondence between pixels of the color image and the depth image; and determining a feature depth of the feature object based on depth (Continued)

information corresponding to the pixels at the second image region.

18 Claims, 6 Drawing Sheets

(51) Int. Cl.
*G06T 7/11* (2017.01)
*G06T 7/70* (2017.01)

(52) U.S. Cl.
CPC .................. *G06T 7/11* (2017.01); *G06T 7/70* (2017.01); *G06T 2207/10016* (2013.01); *G06T 2207/10024* (2013.01); *G06T 2207/10028* (2013.01); *G06T 2207/30196* (2013.01); *G06T 2207/30241* (2013.01)

(58) Field of Classification Search
CPC . G06T 2207/10028; G06T 2207/30241; G06T 7/0071; G06T 7/20; G06T 7/0081; G06T 7/11; G06T 7/204; G06T 7/248; G06T 7/579
See application file for complete search history.

(56) References Cited

U.S. PATENT DOCUMENTS

| | | | |
|---|---|---|---|
| 2013/0201291 | A1 | 8/2013 | Liu et al. |
| 2014/0267633 | A1 | 9/2014 | Venkataraman et al. |

FOREIGN PATENT DOCUMENTS

| | | | |
|---|---|---|---|
| CN | 102982557 | A | 3/2013 |
| CN | 103268482 | A | 8/2013 |
| CN | 103324977 | A | 9/2013 |
| CN | 103413309 | A | 11/2013 |
| CN | 103576840 | A | 2/2014 |
| CN | 103644894 | A | 3/2014 |
| CN | 103793685 | A | 5/2014 |
| CN | 103810480 | A | 5/2014 |
| CN | 104346816 | A | 2/2015 |
| WO | WO-2013-119352 | A1 | 8/2013 |
| WO | WO-2014-145856 | A1 | 9/2014 |

OTHER PUBLICATIONS

Written Opinion of the International Searching Authority for international application No. PCT/CN2015/075043.

* cited by examiner

DEPTH DETERMINATION METHOD, DEPTH DETERMINATION DEVICE AND ELECTRONIC DEVICE

CROSS-REFERENCE TO RELATED APPLICATIONS

This application is the U.S. national phase of PCT Application No. PCT/CN2015/075043 filed on Mar. 25, 2015, which claims a priority of the Chinese Patent Application No. 201410534378.X filed on Oct. 11, 2014, the disclosures of which are incorporated in their entirety by reference herein.

TECHNICAL FIELD

The present disclosure relates to the field of camera, in particular to a depth determination method, a depth determination device and an electronic device.

BACKGROUND

The Chinese patent application No. 201080006305.3 filed on Jan. 12, 2010 by Microsoft Corporation and entitled "Visual Target Tracking" had proposed a scheme relevant to visual target tracking, where a target was tracked by receiving an observed depth image of the target from a source and obtaining a pose model of the target, the pose model was rasterized into a synthesized depth image, and the pose of the model was then adjusted based, at least in part, on differences between the observed depth image and the synthesized depth image.

In the above-mentioned method, an accurate depth image is required for the subsequent processings, and this accurate depth image may be obtained by a depth camera. However, currently the depth camera with high accuracy is very expensive, e.g., the price of Mesa Imaging SwissRanger 4000 (SR4000) is as high as ten thousands of US dollars.

SUMMARY

An object of the present disclosure is to provide a depth determination method, a depth determination device and an electronic device, so as to obtain a feature depth of a feature object even when the accuracy of a depth image outputted from a camera is low.

In one aspect, the present disclosure provides in one embodiment a depth determination method, including steps of: acquiring a color image and a depth image from a camera; performing image identification based on the color image, and determining a first image region of the color image where a feature object is recorded; determining a second image region of the depth image corresponding to the first image region in accordance with a correspondence between pixels of the color image and the depth image; and determining a feature depth of the feature object based on depth information corresponding to the pixels at the second image region.

Alternatively, the step of determining the feature depth of the feature object based on the depth information corresponding to the pixels at the second image region includes: acquiring an pixel depth of each pixel at the second image region of the depth image, thereby obtaining an pixel depth set; and determining the most frequently occurred pixel depth in the pixel depth set as the feature depth.

Alternatively, the depth determination method further includes: determining whether or not the feature object is recorded in the color image after acquiring the color image; and when the feature object is recorded in the color image, proceeding to the step of determining the first image region, and otherwise, returning to the step of acquiring the color image and the depth image.

Alternatively, the depth determination method further includes: determining an instruction for controlling an application in accordance with a feature depth sequence formed by the feature depths of the feature object; and executing the instruction so as to control the application.

Alternatively, the step of determining the instruction for controlling the application in accordance with the feature depth sequence formed by the feature depths of the feature object includes: determining an original trajectory of the feature object in accordance with the feature depth sequence; determining a standard trajectory that matches the original trajectory; and acquiring the instruction corresponding to the standard trajectory.

Alternatively, the depth determination method further includes determining a first sub-trajectory of the feature object in accordance with position change information about the first image region of the color image collected continuously, and the step of determining the original trajectory of the feature object in accordance with the feature depth sequence includes determining a second sub-trajectory of the feature object in accordance with the feature depth sequence and combining the first sub-trajectory and the second sub-trajectory to obtain the original trajectory.

Alternatively, the step of determining the instruction for controlling the application in accordance with the feature depth sequence formed by the feature depths of the feature object includes: extracting a predetermined number of up-to-date feature depths from the feature depth sequence; calculating a cumulative depth change value of the feature object in accordance with the predetermined number of up-to-date feature depths; determining a user gesture in accordance with the cumulative depth change value; and determining the corresponding instruction for controlling the application in accordance with the user gesture.

Alternatively, the depth determination method further includes acquiring shape change information about the first image region of the color image collected continuously, and the step of determining the user gesture in accordance with the cumulative depth change value includes determining the user gesture in accordance with the cumulative depth change value and the shape change information about the first image region.

In another aspect, the present disclosure provides in one embodiment a depth determination device, including: an acquiring module configured to acquire a color image and a depth image from a camera; a first image region determination module configured to perform image identification based on the color image, and determine a first image region of the color image where a feature object is recorded; a second image region determination module configured to determine a second image region of the depth image corresponding to the first image region in accordance with a correspondence between pixels of the color image and the depth image; and a depth determination module configured to determine a feature depth of the feature object based on depth information corresponding to the pixels at the second image region.

Alternatively, the depth determination module includes: a pixel depth acquisition unit configured to acquire an pixel depth of each pixel at the second image region of the depth image, so as to obtain an pixel depth set; and a statistics unit configured to determine the most frequently occurred pixel depth in the pixel depth set as the feature depth.

Alternatively, the depth determination device further includes: a determination module configured to determine whether or not the feature object is recorded in the color image after acquiring the color image; and a triggering module configured to, when the feature object is recorded in the color image, trigger the first image region determination module; and otherwise, trigger the acquiring module.

Alternatively, the depth determination device further includes: an instruction determination module configured to determine an instruction for controlling an application in accordance with a feature depth sequence formed by the feature depths of the feature object; and an execution module configured to execute the instruction so as to control the application.

Alternatively, the instruction determination module includes: a first trajectory determination unit configured to determine an original trajectory of the feature object in accordance with the feature depth sequence; a matching unit configured to determine a standard trajectory that matches the original trajectory; and a first instruction acquisition unit configured to acquire the instruction corresponding to the standard trajectory.

Alternatively, the depth determination device further includes: a second trajectory determination unit configured to determine a first sub-trajectory of the feature object in accordance with position change information about the first image region of the color image collected continuously, and the first trajectory determination unit is specifically configured to determine a second sub-trajectory of the feature object in accordance with the feature depth sequence and combine the first sub-trajectory and the second sub-trajectory to obtain the original trajectory.

Alternatively, the depth determination device is used for gesture control, and the instruction determination module includes: an extraction unit configured to extract a predetermined number of the up-to-date feature depths from the feature depth sequence; a cumulative depth calculation unit configured to calculate a cumulative depth change value of the feature object in accordance with the predetermined number of up-to-date feature depths; a gesture determination unit configured to determine a user gesture in accordance with the cumulative depth change value; and a second instruction acquisition unit configured to determine the corresponding instruction for controlling the application in accordance with the user gesture.

Alternatively, the depth determination device further includes a shape change determination module configured to acquire shape change information about the first image region of the color image collected continuously, and the gesture determination unit is specifically configured to determine the user gesture in accordance with the cumulative depth change value and the shape change information about the first image region.

In yet another aspect, the present disclosure provides in one embodiment an electronic device including a depth camera for collecting and outputting a color image and a depth image, and the above-mentioned depth determination device.

According to the embodiments of the present disclosure, the feature depth of the feature object recoded at the first image region of the color image is determined in accordance with the correspondence between the color image and the depth image collected and outputted by the camera, so it is able to obtain the feature depth of the feature object even when the accuracy of the depth image is low and it is difficult to identify the feature object.

DETAILED DESCRIPTION

In order to make the objects, the technical solutions and the advantages of the present disclosure more apparent, the present disclosure will be described hereinafter in conjunction with the drawings and embodiments.

Figure 1:
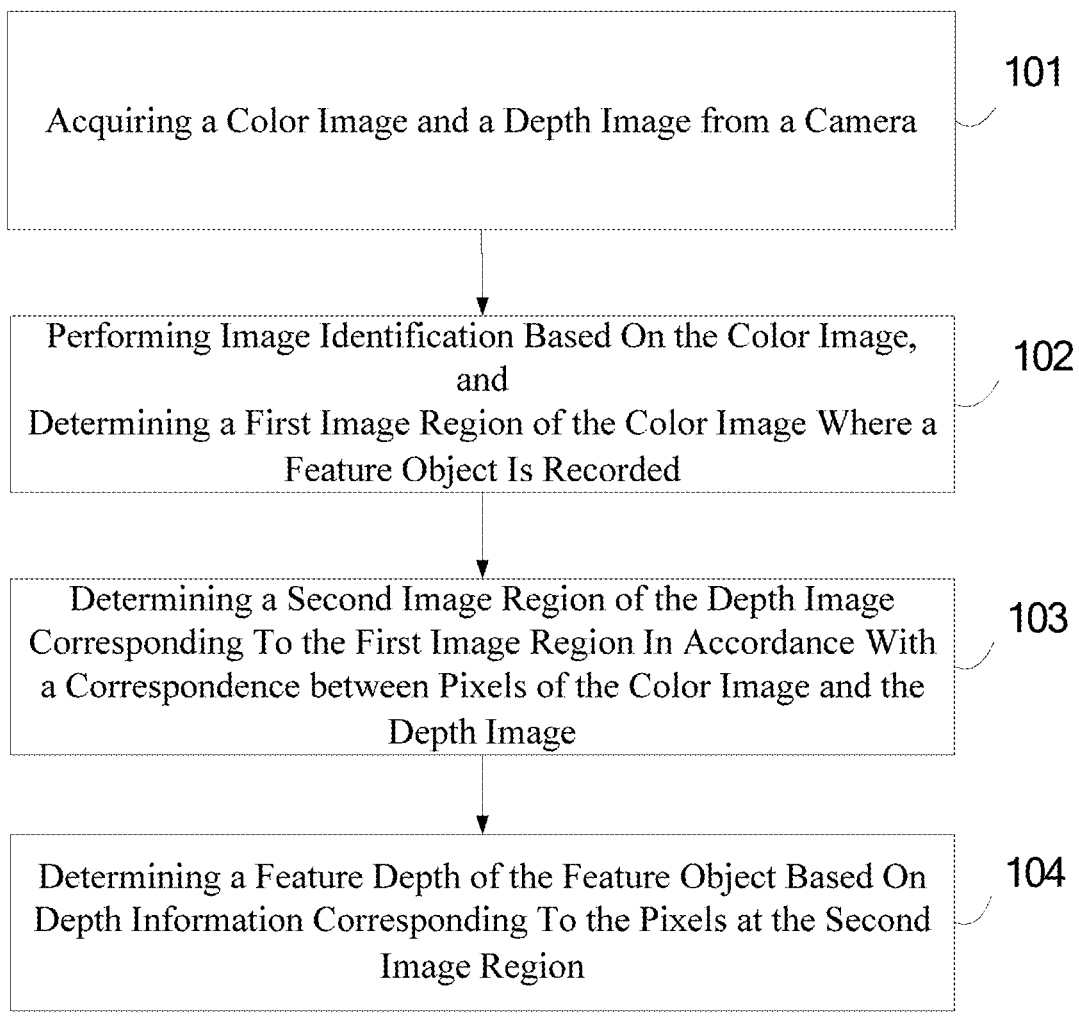
FIG. 1 is a flow chart of a depth determination method according to one embodiment of the present disclosure.

Referring to FIG. 1, which is a flow chart of a depth determination method according to one embodiment of the present disclosure, the depth determination method includes:

Step 101 of acquiring a color image and a depth image from a camera;

Step 102 of performing image identification based on the color image, and determining a first image region of the color image where a feature object is recorded;

Step 103 of determining a second image region of the depth image corresponding to the first image region in accordance with a correspondence between pixels of the color image and the depth image; and Step 104 of determining a feature depth of the feature object based on depth information corresponding to the pixels at the second image region.

According to the embodiments of the present disclosure, the feature depth of the feature object recoded at the first image region of the color image is determined in accordance with the correspondence between the color image and the depth image collected and outputted by the camera, so it is able to identify a position of the feature object in the depth image and thereby to obtain the feature depth of the feature object even when the accuracy of the depth image is low and it is difficult to identify the feature object.

Alternatively, the color image in the embodiments of the present disclosure may be a RGB image.

The feature object may include various objects prescribed in an application, e.g., a hand, an entire human body, or any other handheld objects (such as a baton), which are not particularly defined herein.

Figure 3A:
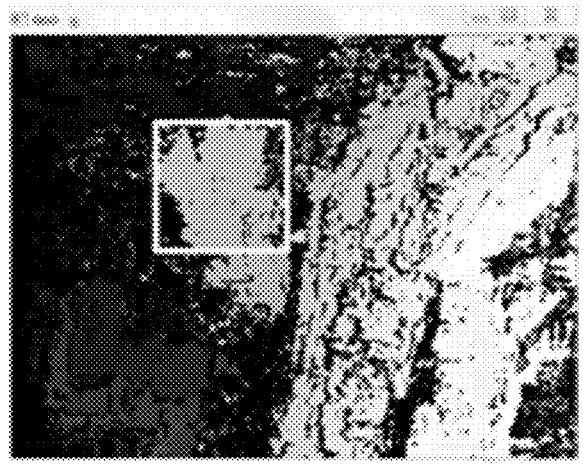
FIGS. 3A and 3B are schematic views showing the situations where a corresponding region of a depth image is acquired through red-green-blue (RGB) hand identification according to one embodiment of the present disclosure.
Figure 3B:
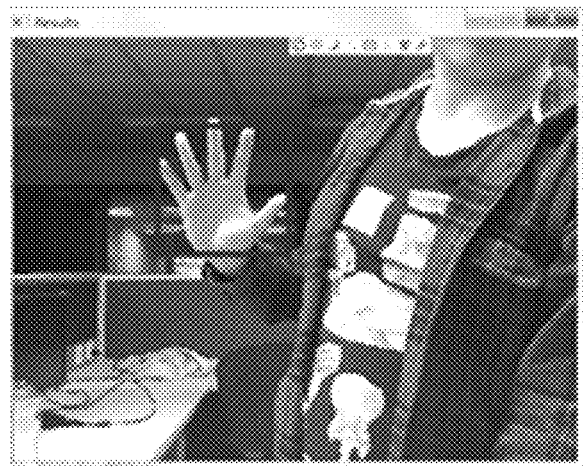

In the embodiments of the present disclosure, when a region where the feature object is located coincides with the second image region, an average of the pixel depths for all the pixels at the second image region may be used as the feature depth of the feature object. However, when a region of the second image region other than the region where the feature object is located is relatively large, for example, as shown in FIGS. 3A and 3B (where FIG. 3A shows the depth image and FIG. 3B shows the RGB image corresponding thereto), the abovementioned way shall not be adopted. To be specific, as obviously shown in FIGS. 3A and 3B, when fingers are spread, the rectangular frame includes a relatively large region apart from the hand. At this time, when the average is used as the feature depth of the feature object, an relatively large error will occur. Hence, the step of determining the feature depth of the feature object based on the depth information corresponding to the pixels at the second image region may include: acquiring an pixel depth of each pixel at the second image region of the depth image, thereby obtaining an pixel depth set; and determining an average of the pixel depths in the pixel depth set other than the least frequently occurred pixel depths as the feature depth of the feature object.

Alternatively, the step of determining the feature depth of the feature object based on the depth information corresponding to the pixels at the second image region may include: acquiring an pixel depth of each pixel at the second image region of the depth image, thereby obtaining an pixel depth set; and determining the most frequently occurred pixel depth(s) in the pixel depth set as the feature depth.

In the embodiments of the present disclosure, when the feature object moves beyond a coverage range of the color image, it will not be recorded in the color image any more. At this time, a waste of processor resources may occur when the subsequent processings are still performed. Hence, in order to acquire the feature depth of the feature object dynamically, the depth determination method may further include: determining whether or not the feature object is recorded in the color image after acquiring the color image; and when the feature object is recorded in the color image, proceeding to the step of determining the first image region, and otherwise, returning to the step of acquiring the color image and the depth image.

In this way, when no feature object is included in a current color image, a next color image may be acquired, so as to acquire the color image and the depth image in real time.

A change in the feature depth of the feature object means a change in a trajectory of the feature object itself, so an electronic device may be controlled, e.g., by an application, on the basis of the movement of the feature object. The depth determination method may further include: determining an instruction for controlling an application in accordance with a feature depth sequence formed by the feature depths of the feature object; and executing the instruction so as to control the application.

Taking a hand as an example, when the feature depths in the feature depth sequence change in a descending order, it means that the hand moves toward the camera. After it is determined in accordance with the depth change that a push-forward action occurs, the corresponding instruction may be executed, e.g., an application may be controlled so as to display a next slide, or an image browser may be controlled so as to zoom out a current image. When the feature depths in the feature depth sequence change in an ascending order, it means that the hand moves away from the camera. After it is determined that a pull-forward action occurs, an instruction corresponding to the pull-backward action may be executed, e.g., the application may be controlled so as to return to a previous slide, or the image browser may be controlled so as to zoom in the current image.

Various modes may be adopted so as to determine the instruction for controlling the application in accordance with the feature depth sequence formed by the feature depths of the feature object.

Mode 1

In this mode, a trajectory of the feature object, e.g., hand, may be determined in accordance with the feature depth, and then the corresponding instruction may be determined in accordance with the trajectory.

At this time, the step of determining the instruction for controlling the application in accordance with the feature depth sequence formed by the feature depths of the feature object may include: determining an original trajectory of the feature object in accordance with the feature depth sequence; determining a standard trajectory that matches the original trajectory; and acquiring the instruction corresponding to the standard trajectory.

When the feature depths in the feature depth sequence change in a descending order, a trajectory may be acquired, and the corresponding instruction may be determined in accordance with this trajectory.

Mode 2

In Mode 1, merely the feature depth is taken into consideration, so it is merely able to determine an action in a longitudinal direction (a direction facing the camera), and when there are many instructions corresponding to an application, it is probably insufficient for the actions of the feature object in the longitudinal direction to represent these instructions. Hence, in Mode 2, an action of the feature object in a transverse direction may be introduced. At this time, the step of determining the instruction for controlling the application in accordance with the feature depth sequence formed by the feature depths of the feature object may further include determining a first sub-trajectory of the feature object in accordance with position change information about the first image region of the color image collected continuously, and the step of determining the original trajectory of the feature object in accordance with the feature depth sequence includes determining a second sub-trajectory of the feature object in accordance with the feature depth sequence and combining the first sub-trajectory and the second sub-trajectory to obtain the original trajectory.

In this way, the vertical movement and the transverse movement of the feature object relative to the camera may be differentiated from each other, and the accurate trajectory (equivalent to the original trajectory) may be obtained in accordance with the transverse movement (equivalent to the first sub-trajectory) and the vertical movement (equivalent to the second sub-trajectory).

Mode 3

In Modes 1 and 2, the application is controlled in accordance with the movement of the feature object. Actually, in Mode 3, the corresponding instruction may be determined merely in accordance with the depth change value of the feature object.

At this time, the step of determining the instruction for controlling the application in accordance with the feature depth sequence formed by the feature depths of the feature object may include: extracting the predetermined number of the up-to-date feature depths from the feature depth sequence; calculating a cumulative depth change value of the feature object in accordance with the predetermined number of the up-to-date feature depths; determining a user gesture in accordance with the cumulative depth change value; and determining the corresponding instruction for controlling the application in accordance with the user gesture.

Here, for example, for an application for displaying a slide, a push-forward gesture corresponds to an instruction for displaying a next slide, and a pull-backward gesture corresponds to an instruction for returning to a previous slide.

Different from Mode 1 where the trajectory of the feature object, i.e., the procedure information, is obtained, in Mode 3, the result information is obtained, i.e., how far the feature object moves, regardless of the procedure information.

Mode 4

In Modes 1, 2 and 3, the application is controlled in accordance with the movement information of the feature object. However, apart from the movement information, shape change information of the feature object may also be used. In order to perform more gesture actions to provide more instructions for controlling the application, the depth determination method may further include acquiring shape change information about the first image region of the color image collected continuously, and the step of determining the user gesture in accordance with the cumulative depth change value includes determining the user gesture in accordance with the cumulative depth change value and the shape change information about the first image region.

The shape change information may be, for example, the information about the change of the hand from a spreading state to a fisting state when an object is grabbed by the user.

For example, when it is determined in accordance with the color image that the hand changes from the spreading state to the fisting state and there is no obvious change in the depth (the cumulative depth change value is less than a predetermined threshold), it may be determined that the user needs to terminate the application. For another example, when it is determined in accordance with the color image that the hand changes from the spreading state to the fisting state and there is an obvious change in the depth (the cumulative depth change value is greater than the predetermined threshold), it may be determined that the user needs to enter a next menu of the application.

In this mode, both the depth information and the shape change information of the feature object are taken into consideration, so it is able to provide more instructions.

The present disclosure will be described hereinafter in more details.

The following alternative embodiment is provided with respect to a depth motion-sensing camera whose principle is different from Kinect and which is used to identify the gesture. Depending on the characteristics of this camera, a profile of a hand is extracted from a RGB image, and mapped onto a depth image, so as to acquire its depth and then identify the gesture in accordance with the trajectories of multi frames. It is able for this camera to identify such actions as "pushing forward", "pulling backward", "grabbing" and "spreading".

In the alternative embodiment, the depth camera may make a judgment on the information included in a RGB video stream and a depth video stream, extract information about the hand's profile and the depth, and then determine the hand's action in accordance with the information about the images.

In the embodiment of the present disclosure, with respect to an inexpensive camera which may output both a color image and a depth image at a high noise level and which may not determine the feature depth fully depending on the depth image, a simple algorithm is used to identify the gesture in accordance with the color image and the depth image.

In the embodiment of the present disclosure, the RGB video stream and the depth video stream are extracted. The RGB video stream is used to provide the profile information, while the depth video stream is used to provide the depth information. The hand's profile may be mapped onto the depth image so as to acquire the depth information about a pixel region, and the hand's action may be determined in accordance with continuous pieces of information.

In the embodiment of the present disclosure, the depth video streams may be populated with coordinates of the pixels in the RGB image collected by a primary camera, or acquired separately. When the depth video streams are acquired separately, for a depth camera, the depth image and the RGB image collected by which do not fully overlap each other, it is required to convert the coordinates of the pixels in advance, so as to enable the depth image and the RGB image to fully overlap each other.

The embodiment of the present disclosure may be applied to a binocular camera which may synchronously output two video streams, i.e., the RGB video stream and the depth video stream, at an identical resolution, and the coordinates of the pixels in the two video streams are in one-to-one correspondence with each other.

Figure 2:
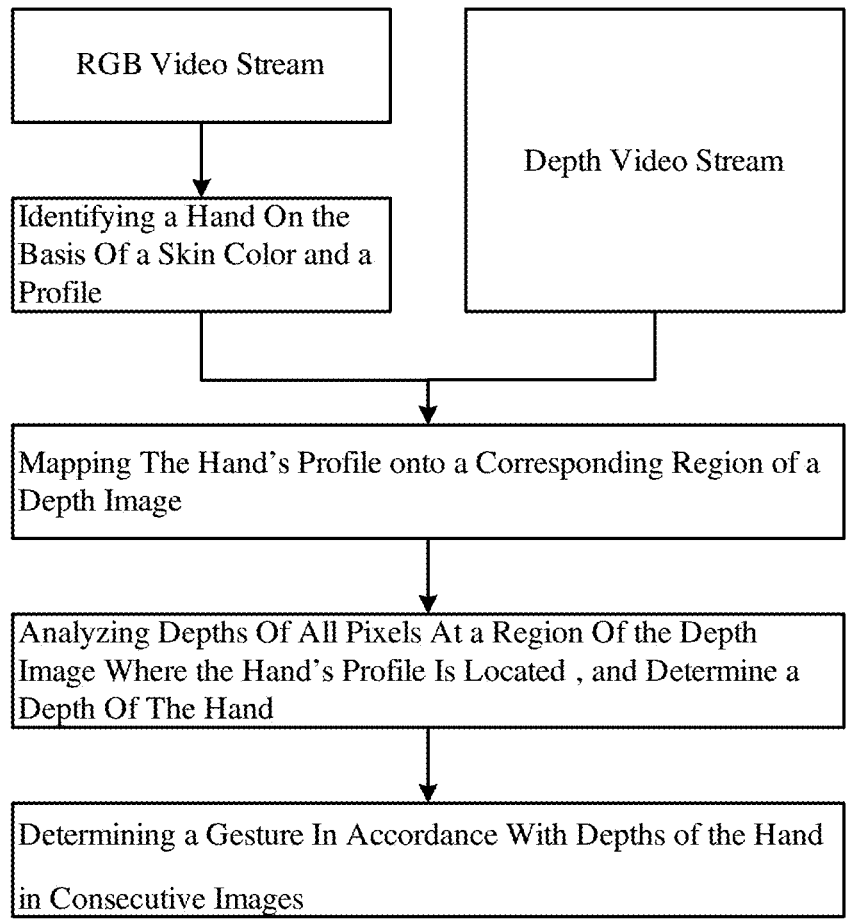
FIG. 2 is another flow chart of the depth determination method according to one embodiment of the present disclosure.

FIG. 2 shows the flow of the depth determination method in the embodiment of the present disclosure.

At first, the two video streams, i.e., the RGB video stream and the depth video stream, are acquired from the camera, and the hand's profile is acquired in accordance with the RGB video stream using a skin-color-and-profile-based identification method.

The coordinates of the pixels in the RGB video stream and the depth video stream from the depth camera substantially correspond to each other, so the hand's profile acquired in accordance with the RGB image may be mapped onto the depth image, as shown in FIGS. 3A and 3B. After acquiring a region of the depth image corresponding to the hand, it is able to determine the depth of the hand in accordance with all pixels at this region.

Figure 4:
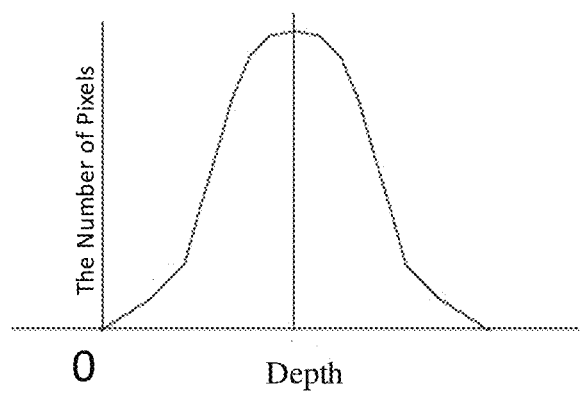
FIG. 4 is a normal depth distribution diagram according to one embodiment of the present disclosure.

FIG. 4 shows a possible implementation mode, where the depth is taken as an X-axis coordinate, and the number of the pixels with the depth is taken as a Y-axis coordinate. The most frequently occurred depth, i.e., the depth corresponding to a peak value, may be used as the depth of the hand.

It should be appreciated that, FIG. 4 is merely provided for illustrative purpose, but shall not be used to represent the real pixel distribution.

In a common RGB-based gesture identification algorithm, when several hands are captured by the camera, instruction misjudgment may occur. However, in the embodiments of the present disclosure, the gestures far away from the camera may be removed through the RGB video stream and the depth video stream, and merely the gesture closest to the camera is taken as the only valid gesture.

After acquiring the depth information about the hand images, the gesture may be determined in accordance with continuous pieces of information, and two typical gestures, i.e., push-forward and grabbing, are merely given herein. In the embodiments of the present disclosure, the binocular camera has a depth range of 0 to 255 and an optimal working distance of 1 to 2.5 m, and may collect the images at 30 frames per second. A method for the action decision will be described hereinafter when this binocular camera is used.

Figure 5:
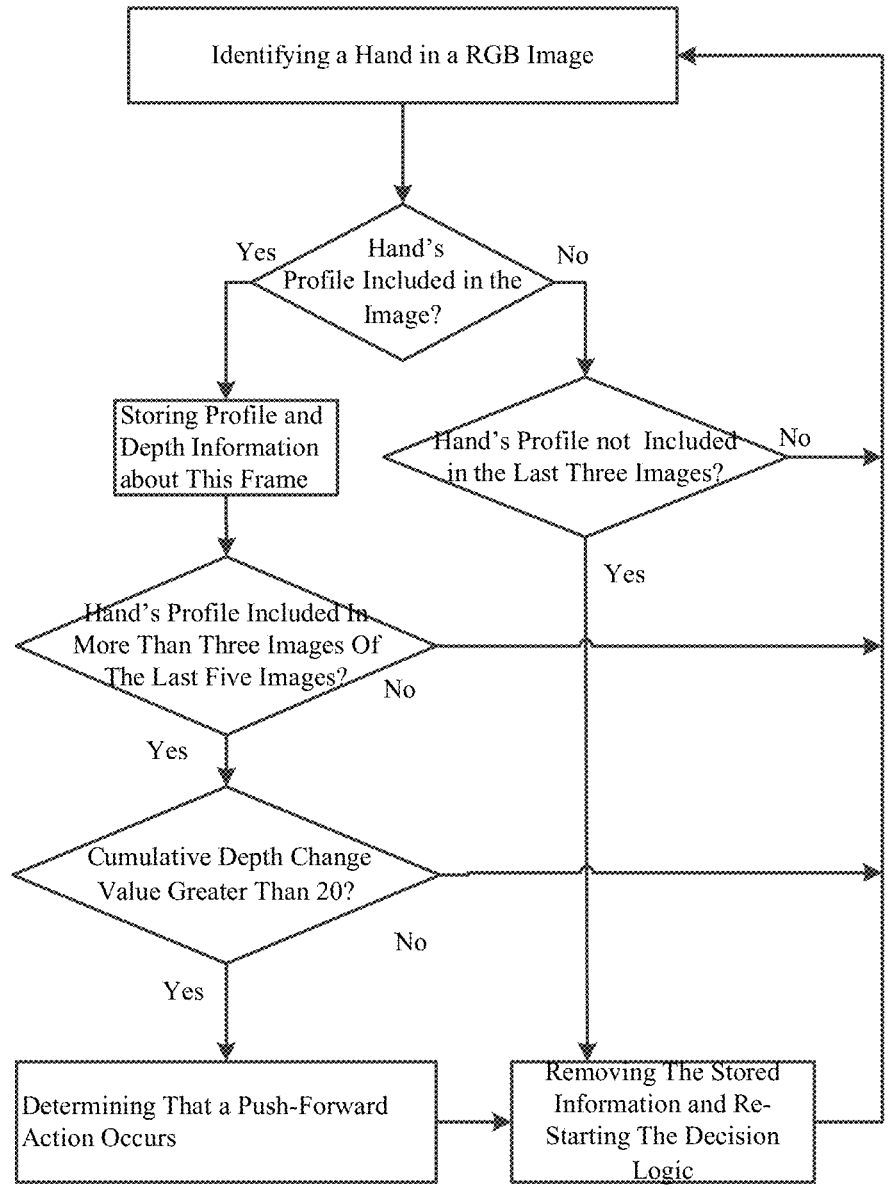
FIG. 5 is a schematic view showing a decision logic for a push-forward action according to one embodiment of the present disclosure.

FIG. 5 shows a push-forward decision logic. At first, whether or not the image includes a hand's profile may be determined, and if yes, the information may be saved. Then, whether or not more than three images in consecutive five images include the hand's profile, and if yes, it may be determined that there is an action sequence. At this time, the depths of the hand in the previous images that include the hand's profile may be compared with each other, and when a cumulative depth change value is greater than 20 and a change in both the X-axis and the Y-axis coordinates of a mass center of the hand is less than 10, it may be determined that a push-forward action occurs. When the action is determined as the push-forward action, the previous five images may be removed, and the decision step may be repeated. When the previous five images include an action sequence but a condition for the push-forward action is not met, a next image may be extracted for the subsequent decision.

Meanwhile, when the last three images are determined as not including the hand's profile, it may be determined that the action has been ended, and the previous five images may be removed too.

Figure 6:
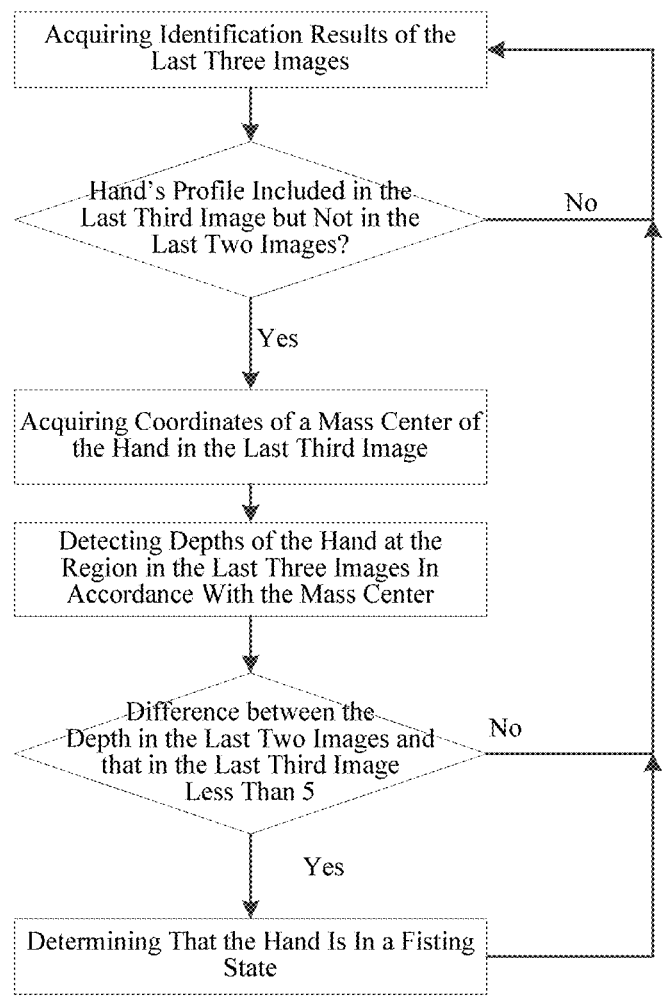
FIG. 6 is a schematic view showing a decision logic for a grabbing action according to one embodiment of the present disclosure.

FIG. 6 shows a decision logic for a grabbing action. This action may be determined in accordance with an identification result of the last three images. When it is determined that the last third image includes the hand's profile and the last two images do not include the hand's profile, the coordinates of the mass center of the hand in the last third RGB image may be extracted, and mapped to a corresponding point in the last three depth images. Then, depths of the 20*20 pixels around this point are selected, and a depth at this region may be obtained through the method shown in FIG. 4 as the depth of the hand in the fisting state. When a difference between the depth of the hand in the last two images and the depth of the hand in the last third image is less than 5, it may be determined that the hand is in the fisting state. When there is no significant change in the coordinates, it may be determined that the change of the hand from the spreading state to the fisting state has been completed, i.e., the user has completed a "grabbing" gesture.

In the embodiment of the present disclosure, when identifying the gesture in accordance with both the RGB video stream and the depth video stream, the hand's profile may be identifier in accordance with the RGB image, the acquired profile is then mapped onto the depth image in accordance with the coordinates of the profile and the depth image information, and then the spatial coordinates of the hand may be acquired by statistics.

The above two gestures are for illustrative purposes only, and any other gestures acquired by the other depth camera, with identical or similar characteristics, using the above-mentioned method shall also fall within the scope of the present disclosure.

Figure 7:
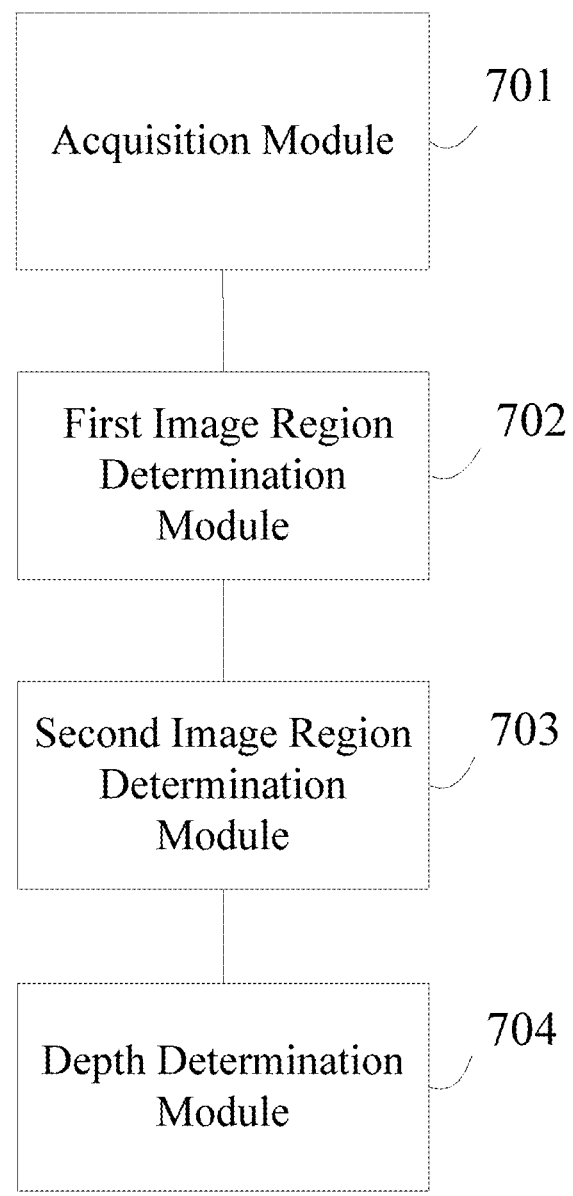
FIG. 7 is a block diagram of a depth determination device according to one embodiment of the present disclosure.

Referring to FIG. 7, which is a block diagram of a depth determination device according to one embodiment of the present disclosure, the depth determination device includes: an acquiring module 701 configured to acquire a color image and a depth image from a camera; a first image region determination module 702 configured to perform image identification based on the color image, and determine a first image region of the color image where a feature object is recorded; a second image region determination module 703 configured to determine a second image region of the depth image corresponding to the first image region in accordance with a correspondence between pixels of the color image and the depth image; and a depth determination module 704 configured to determine a feature depth of the feature object based on depth information corresponding to the pixels at the second image region.

According to the depth determination device in the embodiments of the present disclosure, the feature depth of the feature object recoded at the first image region of the color image is determined in accordance with the correspondence between the color image and the depth image collected and outputted by the camera, so it is able to obtain the feature depth of the feature object even when the accuracy of the depth image is low and it is difficult to identify the feature object.

The depth determination module 704 may include: a pixel depth acquisition unit configured to acquire a pixel depth of each pixel at the second image region of the depth image, so as to obtain an pixel depth set; and a statistics unit configured to determine the most frequently occurred pixel depth in the pixel depth set as the feature depth.

In addition, the depth determination device may further include: a determination module configured to determine whether or not the feature object is recorded in the color image after acquiring the color image; and a triggering module configured to, when the feature object is recorded in the color image, trigger the first image region determination module 702; and otherwise, trigger the acquiring module 701.

The depth determination device may further include: an instruction determination module configured to determine an instruction for controlling an application in accordance with a feature depth sequence formed by the feature depths of the feature object; and an execution module configured to execute the instruction so as to control the application.

The instruction determination module may include: a first trajectory determination unit configured to determine an original trajectory of the feature object in accordance with the feature depth sequence; a matching unit configured to determine a standard trajectory that matches the original trajectory; and a first instruction acquisition unit configured to acquire the instruction corresponding to the standard trajectory.

The instruction determination module may further include a second trajectory determination unit configured to determine a first sub-trajectory of the feature object in accordance with position change information about the first image region of the color image collected continuously, and the first trajectory determination unit is specifically configured to determine a second sub-trajectory of the feature object in accordance with the feature depth sequence and combine the first sub-trajectory and the second sub-trajectory to obtain the original trajectory.

In addition, the depth determination device may be used for gesture control, and the instruction determination module may include an extraction unit configured to extract the predetermined number of the up-to-date feature depths from the feature depth sequence; a cumulative depth calculation unit configured to calculate a cumulative depth change value of the feature object in accordance with the predetermined number of the up-to-date feature depths; a gesture determination unit configured to determine a user gesture in accordance with the cumulative depth change value; and a second instruction acquisition unit configured to determine the corresponding instruction for controlling the application in accordance with the user gesture.

The instruction determination module may further include a shape change determination module configured to acquire shape change information about the first image region of the color image collected continuously, and the gesture determination unit is specifically configured to determine the user gesture in accordance with the cumulative depth change value and the shape change information about the first image region.

The present disclosure further provides in one embodiment an electronic device including a depth camera for collecting and outputting a color image and a depth image, and the above-mentioned depth determination device.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A depth determination method, comprising steps of:
acquiring a color image and a depth image from a camera;
performing image identification based on the color image, and determining a first image region of the color image where a feature object is recorded;
determining a second image region of the depth image corresponding to the first image region in accordance with a correspondence between pixels of the color image and the depth image; and
determining a feature depth of the feature object based on depth information corresponding to the pixels at the second image region,
wherein the step of the determining the feature depth of the feature object based on the depth information corresponding to the pixels at the second image region comprises:
acquiring an pixel depth of each pixel at the second image region of the depth image, thereby obtaining an pixel depth set; and
determining the most frequently occurred pixel depth in the pixel depth set as the feature depth.

2. The depth determination method according to claim 1, further comprising:
determining whether or not the feature object is recorded in the color image after acquiring the color image; and
when the feature object is recorded in the color image, proceeding to the step of determining the first image region, and otherwise, returning to the step of acquiring the color image and the depth image.

3. The depth determination method according to claim 1, further comprising:
determining an instruction for controlling an application in accordance with a feature depth sequence formed by the feature depths of the feature object; and
executing the instruction to control the application.

4. The depth determination method according to claim 3, wherein the step of determining the instruction for controlling the application in accordance with the feature depth sequence formed by the feature depths of the feature object comprises:
determining an original trajectory of the feature object in accordance with the feature depth sequence;
determining a standard trajectory that matches the original trajectory; and
acquiring the instruction corresponding to the standard trajectory.

5. The depth determination method according to claim 4, further comprising:
determining a first sub-trajectory of the feature object in accordance with position change information about the first image region of the color image collected continuously,
wherein the step of determining the original trajectory of the feature object in accordance with the feature depth sequence comprises:
determining a second sub-trajectory of the feature object in accordance with the feature depth sequence, and
combining the first sub-trajectory and the second sub-trajectory to obtain the original trajectory.

6. The depth determination method according to claim 3, wherein the step of determining the instruction for controlling the application in accordance with the feature depth sequence formed by the feature depths of the feature object comprises:
extracting a predetermined number of up-to-date feature depths from the feature depth sequence;
calculating a cumulative depth change value of the feature object in accordance with the predetermined number of up-to-date feature depths;
determining a user gesture in accordance with the cumulative depth change value; and
determining the corresponding instruction for controlling the application in accordance with the user gesture.

7. The depth determination method according to claim 6, further comprising:
acquiring shape change information about the first image region of the color image collected continuously,
wherein the step of determining the user gesture in accordance with the cumulative depth change value comprises:
determining the user gesture in accordance with the cumulative depth change value and the shape change information about the first image region.

8. A depth determination device, comprising:
an acquiring module configured to acquire a color image and a depth image from a camera;
a first image region determination module configured to perform image identification based on the color image, and determine a first image region of the color image where a feature object is recorded;
a second image region determination module configured to determine a second image region of the depth image corresponding to the first image region in accordance with a correspondence between pixels of the color image and the depth image; and
a depth determination module configured to determine a feature depth of the feature object based on depth information corresponding to the pixels at the second image region,
wherein the depth determination module comprises:
a pixel depth acquisition unit configured to acquire an pixel depth of each pixel at the second image region of the depth image, so as to obtain an pixel depth set; and
a statistics unit configured to determine the most frequently occurred pixel depth in the pixel depth set as the feature depth.

9. The depth determination device according to claim 8, further comprising:
a determination module configured to determine whether or not the feature object is recorded in the color image after acquiring the color image; and
a triggering module configured to, when the feature object is recorded in the color image, trigger the first image region determination module; and
otherwise, trigger the acquiring module.

10. The depth determination device according to claim 8, further comprising:
an instruction determination module configured to determine an instruction for controlling an application in accordance with a feature depth sequence formed by the feature depths of the feature object; and
an execution module configured to execute the instruction to control the application.

11. The depth determination device according to claim 10, wherein the instruction determination module comprises:

a first trajectory determination unit configured to determine an original trajectory of the feature object in accordance with the feature depth sequence;

a matching unit configured to determine a standard trajectory that matches the original trajectory; and a first instruction acquisition unit configured to acquire the instruction corresponding to the standard trajectory.

12. The depth determination device according to claim 11, further comprising:

a second trajectory determination unit configured to determine a first sub-trajectory of the feature object in accordance with position change information about the first image region of the color image collected continuously, wherein the first trajectory determination unit is configured to determine a second sub-trajectory of the feature object in accordance with the feature depth sequence and combine the first sub-trajectory and the second sub-trajectory to obtain the original trajectory.

13. The depth determination device according to claim 10, wherein the instruction determination module further comprises:

an extraction unit configured to extract a predetermined number of up-to-date feature depths from the feature depth sequence;

a cumulative depth calculation unit configured to calculate a cumulative depth change value of the feature object in accordance with the predetermined number of up-to-date feature depths;

a gesture determination unit configured to determine a user gesture in accordance with the cumulative depth change value; and a second instruction acquisition unit configured to determine the corresponding instruction for controlling the application in accordance with the user gesture.

14. The depth determination device according to claim 13, further comprising:

a shape change determination module configured to acquire shape change information about the first image region of the color image collected continuously, wherein the gesture determination unit is configured to determine the user gesture in accordance with the cumulative depth change value and the shape change information about the first image region.

15. An electronic device, comprising a depth camera for collecting and outputting a color image and a depth image, and the depth determination device according to claim 8.

16. The depth determination method according to claim 1, further comprising:

determining an instruction for controlling an application in accordance with a feature depth sequence formed by the feature depths of the feature object; and executing the instruction to control the application.

17. The depth determination method according to claim 2, further comprising:

determining an instruction for controlling an application in accordance with a feature depth sequence formed by the feature depths of the feature object; and executing the instruction to control the application.

18. The depth determination device according to claim 8, further comprising:

an instruction determination module configured to determine an instruction for controlling an application in accordance with a feature depth sequence formed by the feature depths of the feature object; and an execution module configured to execute the instruction to control the application.

* * * * *